(12) United States Patent
Hoshino

(10) Patent No.: US 6,560,199 B1
(45) Date of Patent: May 6, 2003

(54) BAND CONTROLLER AND ITS BUFFER OVERFLOW QUENCHING METHOD

(75) Inventor: Shinzi Hoshino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/489,019

(22) Filed: Jan. 21, 2000

(30) Foreign Application Priority Data

Jan. 22, 1999 (JP) ............................................ 11-014908

(51) Int. Cl.$^7$ .............................. H04J 3/14; H04L 12/26
(52) U.S. Cl. ...................................... 370/236; 370/232
(58) Field of Search ........................ 714/708; 370/229, 370/235, 236, 232, 230

(56) References Cited

U.S. PATENT DOCUMENTS 6,038,215 A * 3/2000 Uekumasu .................. 370/230

FOREIGN PATENT DOCUMENTS

JP           2001268114 A  *  9/2001 ........... H04L/12/56

OTHER PUBLICATIONS

"NAK–based Flow Control Scheme for Reliable Multicast Communications" by Tamamoto et al. Global Telecommunications Conference, 1998 IEEE GLOBECOM 1998 'The Bridge to Global Integration' page(s): 2611–2616 vol. 5 Nov. 8–12, 1998.*

W. Prue, J. Postel, "Something a Host Could Do with Source Quench: The Source Quench Introduced Delay (SquID)", RFC1016 (Network Working Group Request for Comments: 1016), Jul. 1987 (Same as Publication 1 in Notification of Reason(s) for Rejection dated Apr. 09, 2001) Barely Legible—Limited.

R. Braden, "Requirements for Internet Hosts—Communication Layers", RFC1122 (Network Working Group Request for Comments: 1122), Oct. 1989.

* cited by examiner

*Primary Examiner*—Albert Decady
*Assistant Examiner*—Cynthia Britt
(74) *Attorney, Agent, or Firm*—Foley & Lardner

(57) ABSTRACT

The band controller of the present invention comprises a band setting and storing part for setting a band for UDP traffic through own device, a band state table for managing information on band states of UDP traffic through own device, a frame generating and analyzing part for directing a transmitting-side device to decrease the transmission rate from the transmitting-side device by analyzing the transmission rate of UDP traffic over the network, calculating the buffer utilization rate in own device based on a setting band and information on band states, generating a source quench message, one of the ICMP messages, if the buffer utilization rate obtained by calculation is equal to or greater than the pre-determined buffer overflow critical utilization rate, and sending out the source quench message to the desired transmitting-side terminal, and a frame send-out timing controlling part for controlling timing of sending out a source quench message.

13 Claims, 9 Drawing Sheets

$$\frac{bu}{ba} \times 100 \geq bc$$

Seq = SEQUENCE NUMBER
Ack = ACKNOWLEDGEMENT NUMBER

UDP FORMAT

BAND CONTROLLER AND ITS BUFFER OVERFLOW QUENCHING METHOD

BACKGROUNDS OF THE INVENTION

1. Field of the Invention

The present invention relates to a band controller for controlling network bands, and more particularly, to a band controller for quenching buffer overflows that may occur during band control for UDP (User Datagram Protocol) traffic of TCP/IP protocol, its buffer overflow quenching method, and a storing medium for storing a buffer overflow quench controlling program.

2. Description of the Related Art

Along with the rapid spread of network utilization in every area of people's activities, an increasing number of networks have come to be forced to carry different types of communication data created on various application programs, all at one time. Such a network is required to provide one guarantee band for each application, which has been met by controlling network bands using routers or other dedicated devices.

TCP/IP protocol, whose extensive use has been driven by the spread of the Internet, comprises TCP (Transmission Control Protocol) for providing connection-type communication services and UDP (User Datagram Protocol) for providing connectionless-type communication services, which together correspond to the transport layer of OSI (Open System Interconnection); either TCP or UDP is chosen for use as appropriate for a specific application. Examples of applications that use TCP include FTP, TELNET, and SMTP; those that use UDP include TFTP, SNMP, and NTP. Applications that conduct multicast to unspecified terminals, which has gained popularity rapidly in recent years, mainly use UDP.

FIG. 10 shows the format of TCP, and FIG. 11 shows the flow of communication processing via TCP. As shown in FIG. 11, in TCP, the transmitting side receives an acknowledgement (ACK) from the receiving side and then sends out packets to be transmitted. Some existing band controllers utilize this mechanism to use an ACK packet effectively, not simply to buffer packets, thereby achieving efficient control of traffic volumes.

FIG. 12 shows the format of UDP. In UDP, acknowledgement is not done by the protocol, but by each application as necessity arises. Since the method of acknowledgement varies among different applications, existing band controllers conduct band control for UDP through buffering only.

However, there is a limit to the capacity of any buffer, and thus a buffer overflow will be caused when the volume of traffic from the transmitting side exceeds the band limitation imposed by a band controller, leading to lost packets or occurrence of re-transmission. In the worst case, the user may even suffer a session timeout and consequent communication stoppage.

As described above, conventional band controllers have a drawback that they perform band control for UDP through buffering only. This often causes a number of problems to occur due to buffer overflows when traffic volumes from the transmitting side exceed the band limitations imposed by these controllers, including lost packets, occurrence of re-transmission, and abnormal end of communication.

SUMMARY OF THE INVENTION

An object of the present invention is to provide a band controller that can eliminate the above-mentioned drawback faced by conventional band controllers during UDP transmission, by quenching buffer overflows by sending a source quench message, one of the ICMP (Internet Control Message Protocol) messages, to the transmitting side to make it decrease its own transmission rate directly before UDP traffic causes a buffer overflow; its buffer overflow quenching method; and a storing medium for storing a buffer overflow quenching program.

According to the first aspect of the invention, a band controller installed on a network for performing band control, comprises a band setting means for setting a band for UDP traffic through own device, a frame generating and analyzing means for directing the transmitting-side device to decrease the transmission rate from the transmitting-side device, by analyzing the transmission rate of UDP traffic over the network; calculating the buffer utilization rate in buffering that occurs if the transmission rate obtained by analysis is greater than the band set on the band setting means, generating a source quench message, one of the ICMP messages, if the buffer utilization rate obtained by calculation is equal to or greater than the predetermined buffer overflow critical utilization rate, and sending the source quench message to the transmitting-side terminal.

In the preferred construction, the band controller further comprises a storing means for storing the total capacity of buffers and the buffer overflow critical utilization rate in a re-writable manner, and wherein the frame generating and analyzing means calculates the buffer space used in own device, based on the band that has been set, the transmission rate that has been obtained through analysis, and transmission time for UDP traffic; calculates the buffer utilization rate from the buffer space used obtained by calculation and the total capacity of the buffers; compares the buffer utilization rate obtained by calculation with the buffer overflow critical utilization rate stored in the storing means, and sends out the source quench message.

In another preferred construction, the band controller further comprises a timing controlling means for controlling the timing of calculation of a buffer utilization rate and sending of the source quench message by the frame generating and analyzing means.

In another preferred construction, the frame generating and analyzing means sends out the source quench message after adding a request rate that shows the requested value to which the transmission rate should be decreased.

In another preferred construction, the frame generating and analyzing means sends out the source quench message repeatedly until the buffer utilization rate becomes equal to or below the buffer overflow critical utilization rate.

According to the second aspect of the invention, a buffer overflow quenching method performed by a band controller installed on a network for performing band control, comprising the steps of analyzing the transmission rate of UDP traffic over a network, calculating the buffer utilization rate in buffering that occurs if the transmission rate obtained by analysis is greater than the preset band, generating a source quench message, one of the ICMP messages, if the buffer utilization rate obtained by calculation is equal to or greater than the predetermined buffer overflow critical utilization rate, and sending the source quench message to the desired transmitting-side terminal.

In the preferred construction, the buffer overflow quenching method further comprises a storing means for storing the total capacity of buffers and the buffer overflow critical utilization rate in a re-writable manner, and comprising the steps of calculating the buffer space used in own device, based on the band that has been set, the transmission rate obtained by analysis, and transmission time for UDP traffic, and calculating the buffer utilization rate from the buffer space used obtained from calculation and the total capacity of the buffers, comparing the buffer utilization rate obtained by calculation with the buffer overflow critical utilization rate stored in the storing means, and sending out the source quench message.

In another preferred construction, the buffer overflow quenching method comprising the step of sending out the source quench message repeatedly until the buffer utilization rate becomes equal to or below the buffer overflow critical utilization rate.

In another preferred construction, the buffer overflow quenching method comprising the step of sending out the source quench message after adding a request rate that shows a requested value to which the transmission rate should be decreased.

According to another aspect of the invention, a computer readable memory storing a buffer overflow quench controlling program for preventing buffer overflows by controlling a band controller installed on a network for performing band control, wherein the buffer overflow quench controlling program comprising the steps of analyzing the transmission rate of UDP traffic over a network, calculating the buffer utilization rate in buffering that occurs if the transmission rate obtained by analysis is greater than the preset band, generating a source quench message, one of the ICMP messages, if the buffer utilization rate obtained by calculation is equal to or greater than the predetermined buffer overflow critical utilization rate, and sending the source quench message to the desired transmitting-side terminal.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
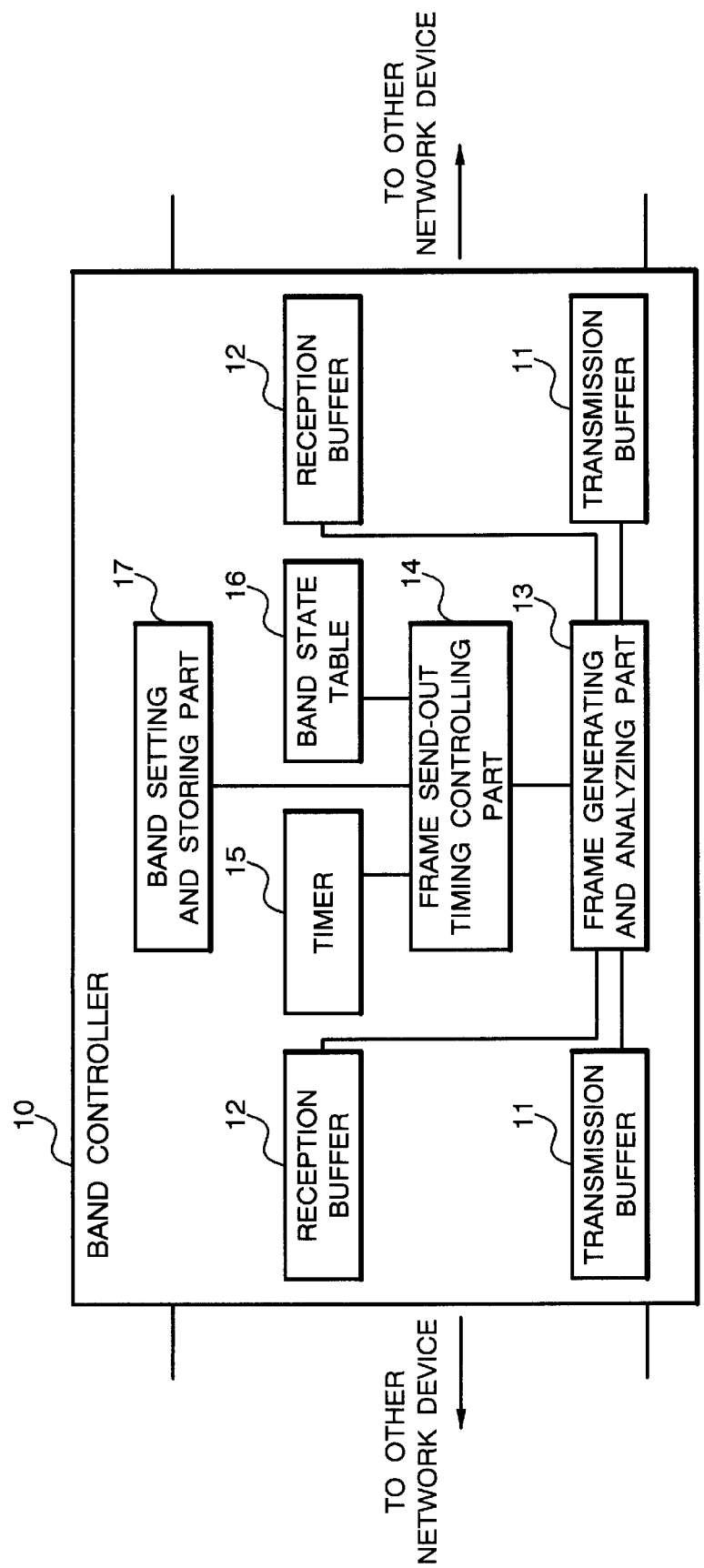
FIG. 1 is a block diagram showing the configuration of a band controller according to one embodiment of the present invention.
Figure 2:
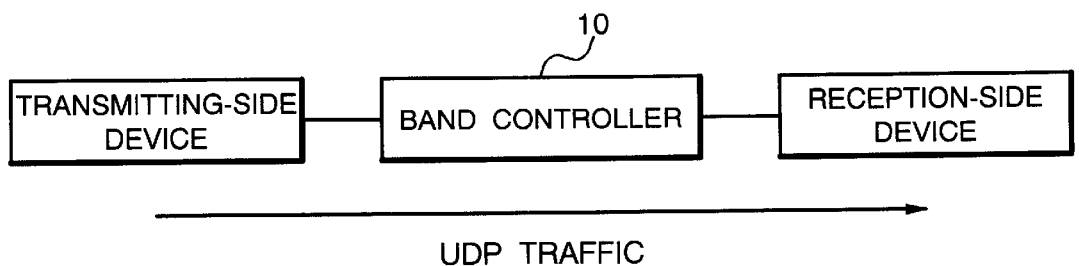
FIG. 2 is a block diagram showing a network configuration containing the band controller according to the present embodiment.

FIG. 1 is a block diagram showing the configuration of a band controller according to one embodiment of the present invention, and FIG. 2 is a block diagram showing a network configuration containing the band controller according to the present embodiment. As shown in FIG. 1, a band controller 10 of the present embodiment comprises a transmission buffer 11 and a reception buffer 12 for performing transmission and reception of communication frames with other devices on the network; a frame generating and analyzing part 13 for analyzing the transmission rate of UDP traffic over the network and for generating source quench messages as necessary; a frame send-out timing controlling part 14 and a timer 15 for controlling timing of sending out a source quench message; a band state table 16 for managing band states; and a band setting and storing part 17 for setting a band for UDP traffic on the band controller 10. In FIG. 1, illustration is made only of a characteristic part of the configuration of the present embodiment but not of the remaining common part.

The components in the above-described configuration are implemented using a program-controlled CPU and a RAM or other internal memory, both incorporated in a PC, workstation, or other computer system. A computer program for controlling the CPU is provided in a magnetic disc, optical disc, semiconductor memory, or other common storing medium; the program controls the CPU to perform the functions of individual components by being loaded into the internal memory of a computer system comprising the band controller 10.

Figure 8:
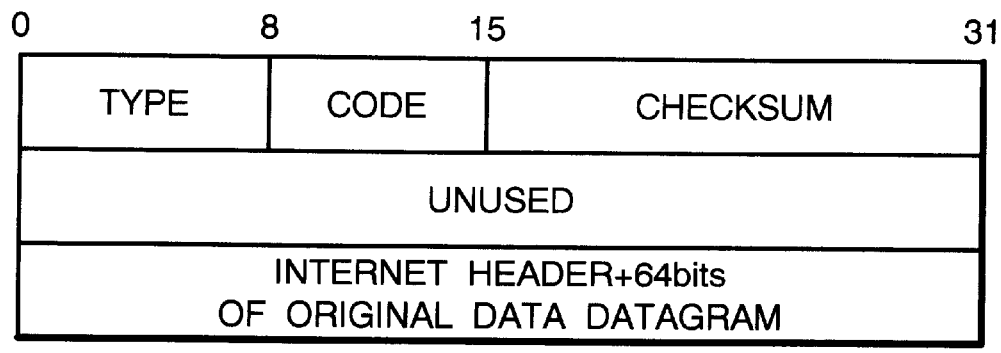
FIG. 8 is a diagram showing the format of source quench message.

The frame generating and analyzing part 13 analyzes the transmission rate of UDP traffic over the network and also calculates as necessary the buffer utilization rate of the transmission buffer 11 and the reception buffer 12 for communication over the network that is input via the reception buffer 12. It then looks up the band table 16 and, if necessary, generates and outputs a source quench message in order to decrease the transmission rate from a specific device. FIG. 8 shows the format of a source quench message prescribed in RFC792 by the IETF (Internet Engineering Task Force).

The frame send-out timing controlling part 14 uses the timer 15 to time intervals between one detection of buffer utilization rate and the next. Based on the resultant timing of detecting buffer utilization rates, it controls the timing of a source quench message sent out from the frame generating and analyzing part 13.

The band state table 16 stores the total capacity of the buffers 11, 12 of the band controller 10 and also stores a preset buffer overflow critical utilization rate. A buffer overflow critical utilization rate refers to a specific ratio of the space already used in the buffers 11, 12 of the band controller 10 in the pre-determined UDP traffic to their total capacity, which is set to indicate that a further increase in the used space in the buffers 11, 12 of the band controller 10 may lead to a buffer overflow. The level to which the buffer overflow critical utilization rate is set can be determined by the user as appropriate, depending on the type of network or application used, expected load on the network, and other factors.

The band setting and storing part 17 sets and stores a network band to which traffic through the band controller 10 is limited. The band set by this component (setting band) is used by the frame generating and analyzing part 13 for calculating the buffer space used.

Figure 3:
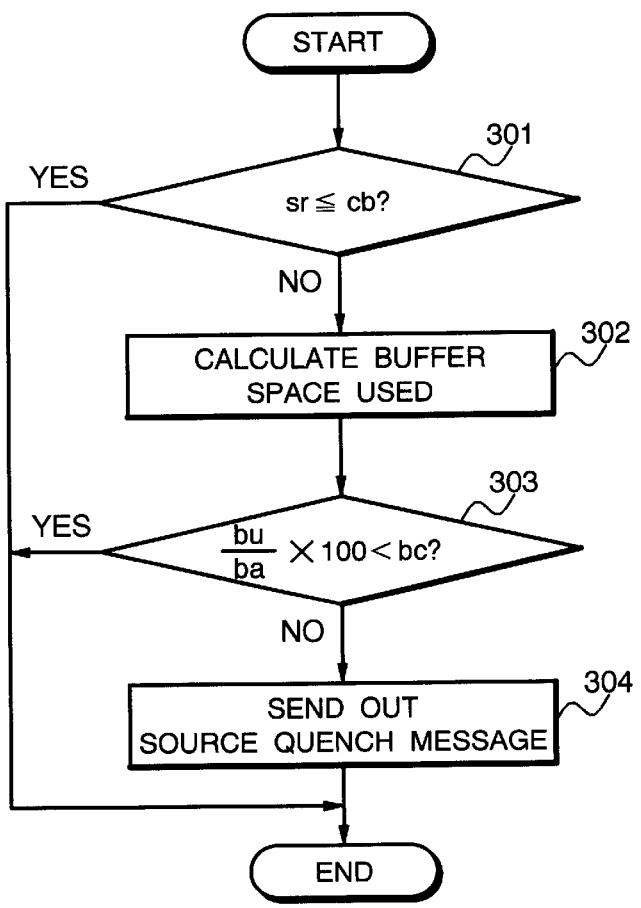
FIG. 3 is a flow chart showing operation according to the present embodiment for transmitting a source quench messages.
Figure 4:
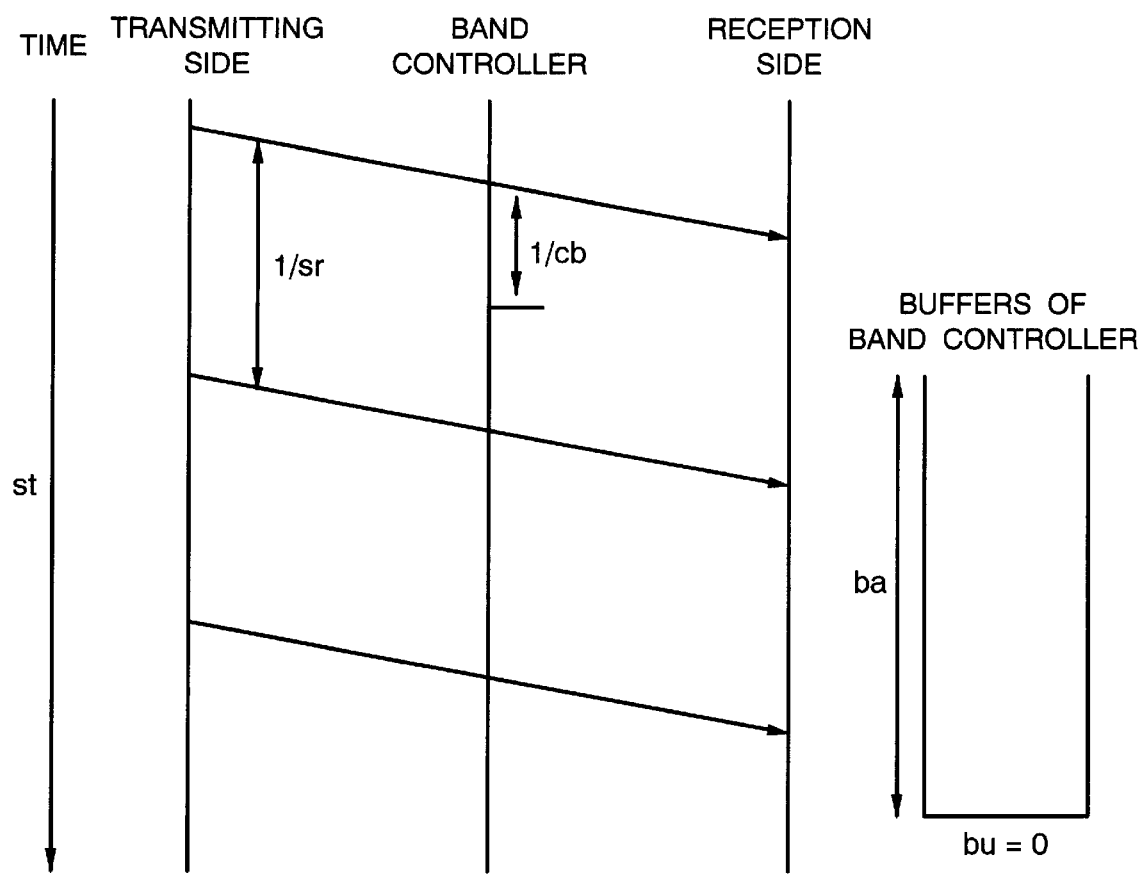
FIG. 4 is a time chart showing the operation of the band controller in dealing with UDP traffic, when transmission rate is equal to or below the setting band on the band controller.

With reference to the flow chart of FIG. 3 and the diagrams of FIGS. 4 to 7, the operation according to the present embodiment will now be described. In the descriptions, the following notations will be used: sr (bps=bit/sec) for the transmission rate of UDP traffic from the transmitting side; ba (bit) for the total capacity of the buffers of the band controller; bu (bit) for the buffer space used of the band controller; cb (bps) for the setting band for UDP traffic through the band controller; bt (sec) for intervals between one detection of buffer utilization rate and the next; bc (%) for the buffer overflow critical utilization rate; and st (sec) for the length of transmission time for UDP traffic. Buffering performed during internal processing time will be ignored here.

In the initial state, the frame generating and analyzing part 13 analyzes the transmission rate of UDP traffic according to the timing control of the frame send-out timing controlling part, based on the value of time given by the timer 15 (Step 301). If the setting band is equal to or greater than the transmission rate (sr≦cb), then buffering will not occur and the reception frames are transmitted to the receiving-side device without any further operation, as shown in the FIG. 4.

Figure 5:
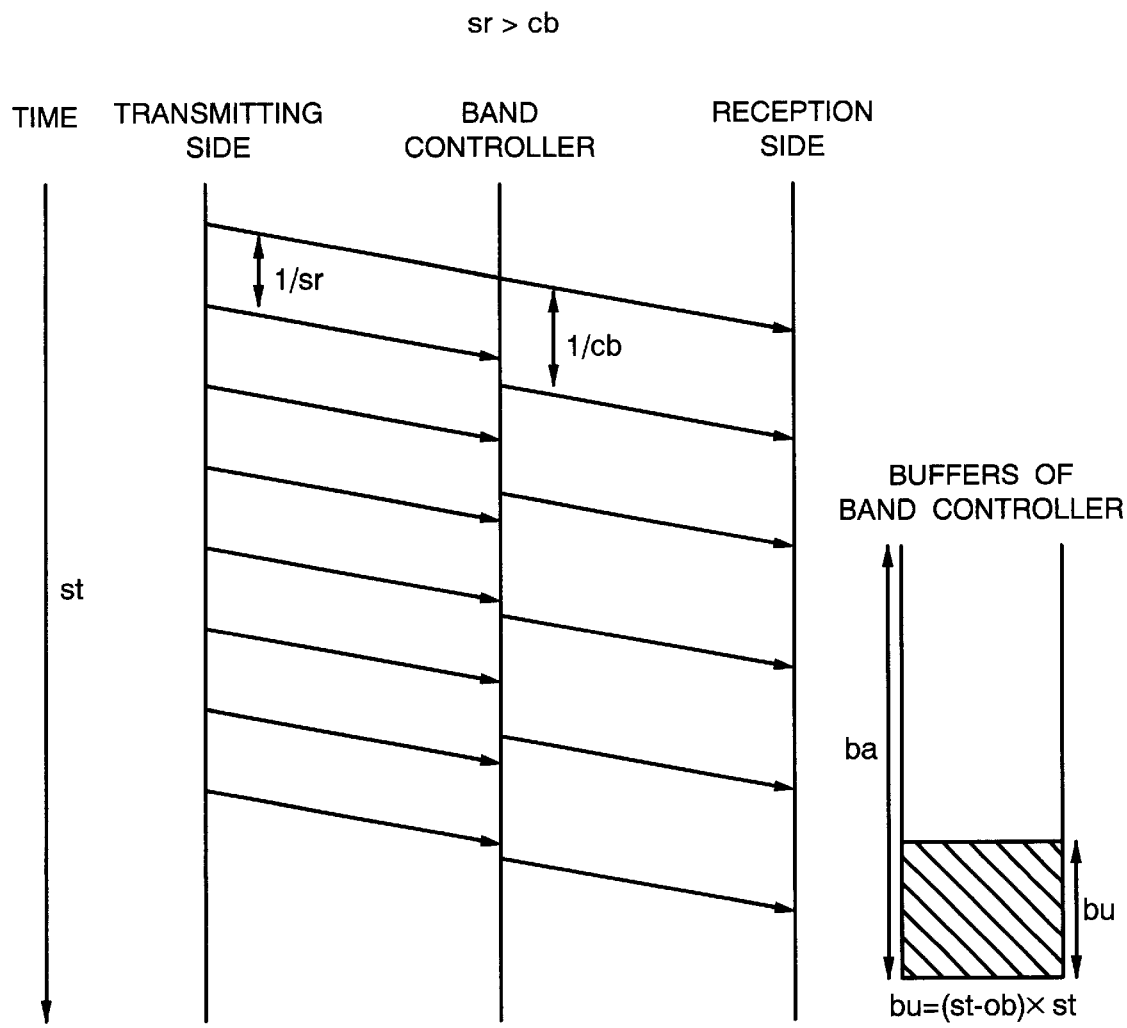
FIG. 5 is a time chart showing the operation of the band controller in dealing with UDP traffic, when the transmission rate is above the setting band on the band controller.

If the transmission rate is greater than the setting band (sr>cb), buffering will occur as shown in FIG. 5. The buffer space used, bu, is calculated using the following expression, based on sr, the transmission rate obtained through analysis by the frame generating and analyzing part 13; cb, the setting band for UDP traffic stored in the band setting and storing part 17; and st, the length of transmission time for UDP traffic (Step 302).

$$bu = (sr - cb) \times st \qquad \text{[Expression. 1]}$$

The frame generating and analyzing part 13 then looks up the band state table 16 and calculates the buffer utilization rate. If the resultant buffer utilization rate is less than the buffer overflow critical utilization rate stored in the band state table, that is, $$\frac{bu}{ba} \times 100 < bc \qquad \text{[Expression 2]}$$

then it means that there is space still available, so no source quench message will be issued (Step 303).

To the contrary, if the buffer utilization rate is above the buffer overflow critical utilization rate, that is, $$\frac{bu}{ba} \times 100 \geq bc \qquad \text{[Expression 3]}$$

then the frame generating and analyzing part 13 generates a source quench message and sends it to the transmitting-side device according to the control of the frame send-out timing controlling part 14 (Step 304). Since the source quench message contains the IP header and UDP header sections of the original packet sent from the transmitting side, the band controller can identify the device, UDP port, or other element whose transmission rate it should cause to be decreased.

Figure 6:
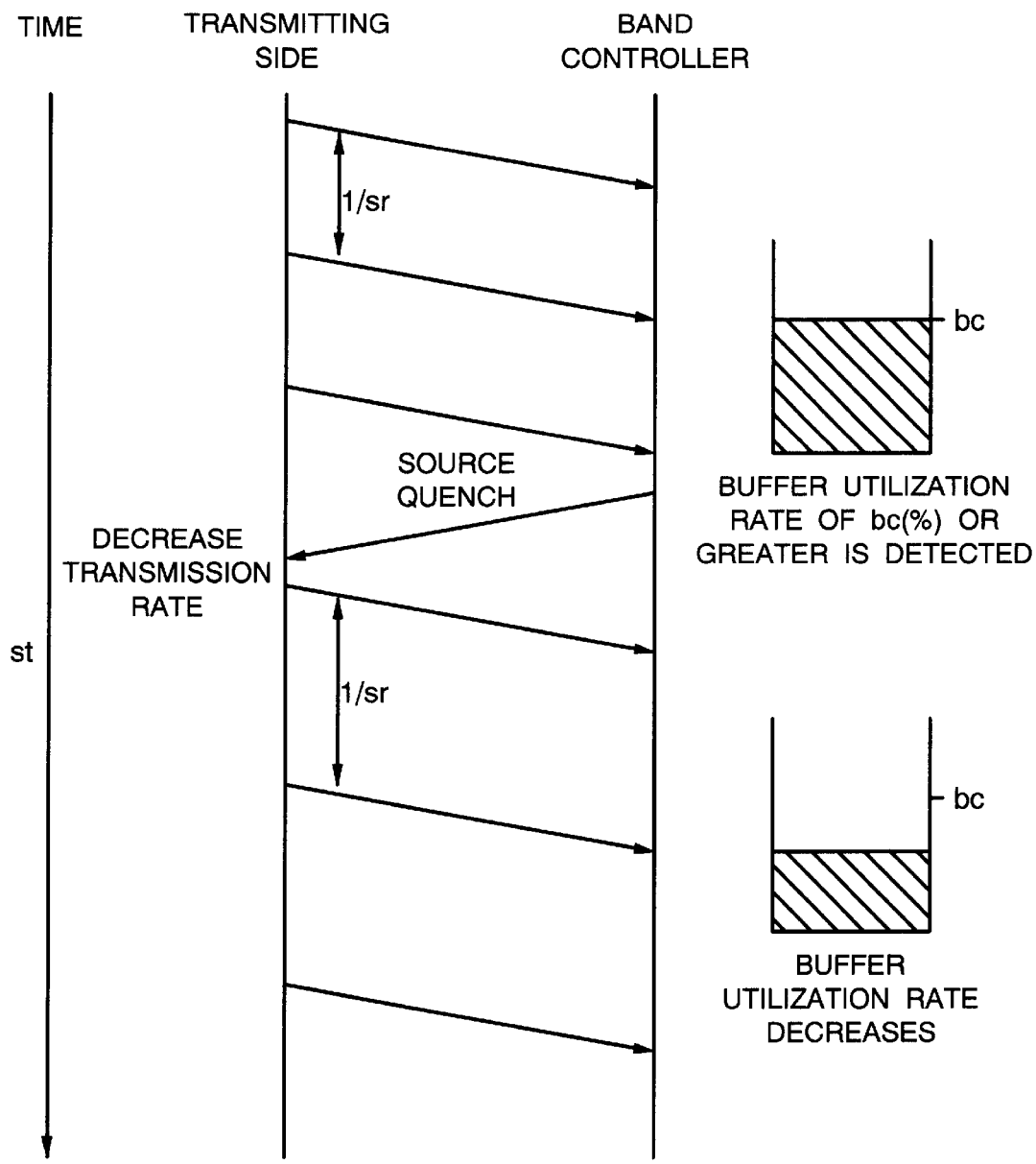
FIG. 6 is a time chart showing the operation of the band controller in dealing with UDP traffic, when the buffer utilization rate is above the buffer overflow critical utilization rate.
Figure 7:
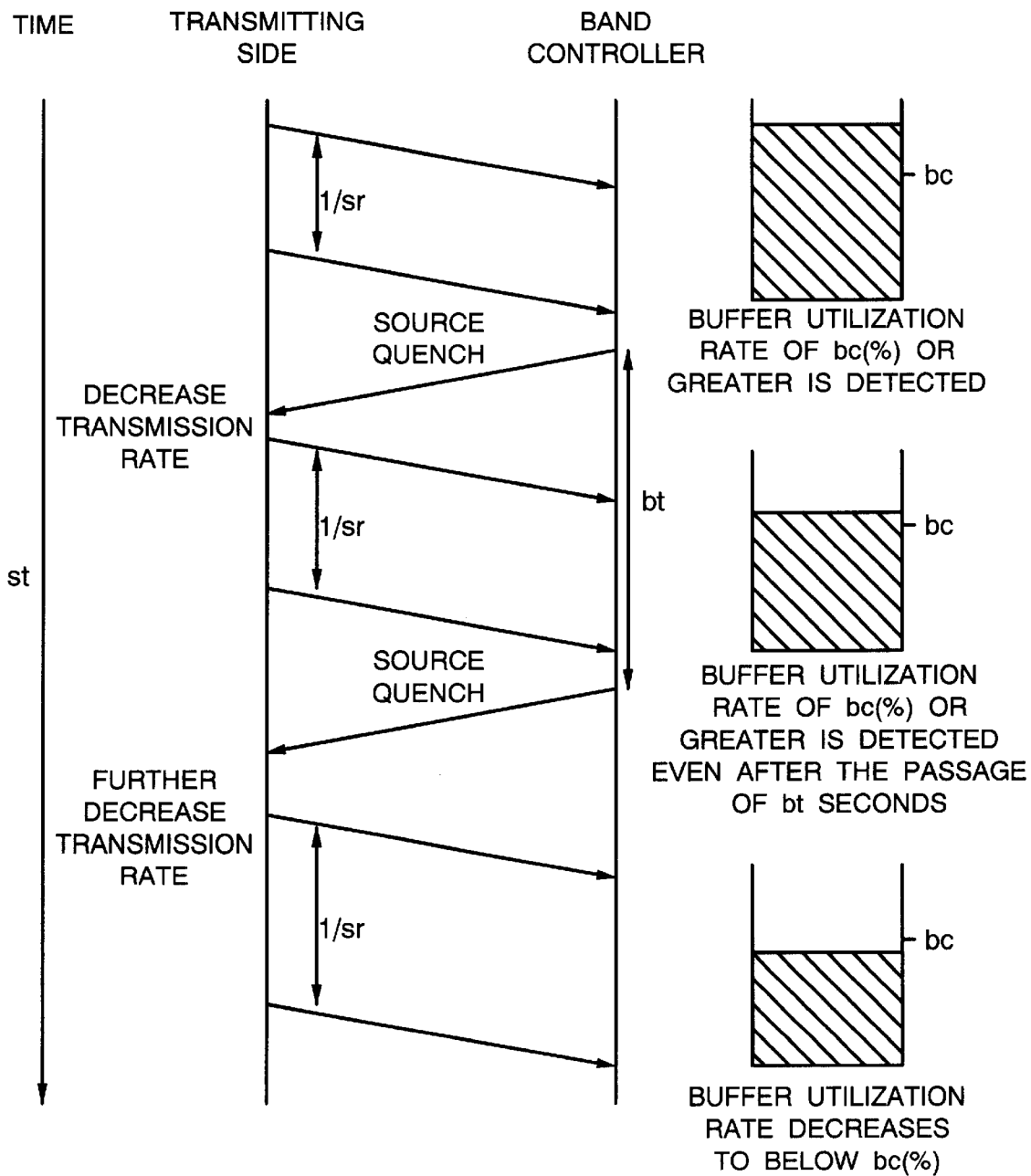
FIG. 7 is a time chart showing the operation of the band controller in dealing with UDP traffic, when re-sending of a source quench message is required.

On receiving the source quench message, the transmitting-side device decreases its transmission rate, as shown in FIG. 6. This causes a decrease in the number of packets utilized and a consequent decreased packet utilization rate.

According to the control of the frame send-out timing controlling part 14, the frame generating and analyzing part 13 of the band controller 10 analyzes the transmission rate again, bt after sending out the source quench message, and calculates the buffer space used to obtain the buffer utilization rate. If the resultant buffer utilization rate has not decreased to below the buffer overflow critical utilization rate, bc, it re-sends a source quench message.

The above-described operation is repeated until the buffer utilization rate, which is determined based on the transmission rate from that transmitting-side device, falls below the buffer overflow critical utilization rate, bc. (see FIG. 7).

A source quench message of ICMP, meanwhile, contains no section specifying to how low the transmission rate should be decreased. This means that the degree of decrease in transmission rate made on the transmitting-side device that has received a source quench message will be dependent on the implementation on such transmitting-side device. In other words, as described above, if the transmission rate from the transmitting-side device has been decreased to some extent but not to below the buffer overflow critical utilization rate, bc, then the source quench message must be sent repeatedly until the buffer utilization rate reaches the level equal to or below the buffer overflow critical utilization rate, bc.

Figure 9:
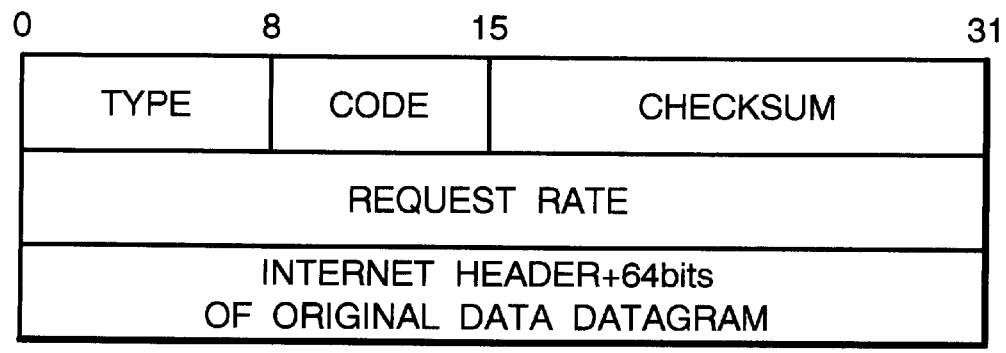
FIG. 9 is a diagram showing the format of source quench message with a request rate written in its unused section.
Figure 10:
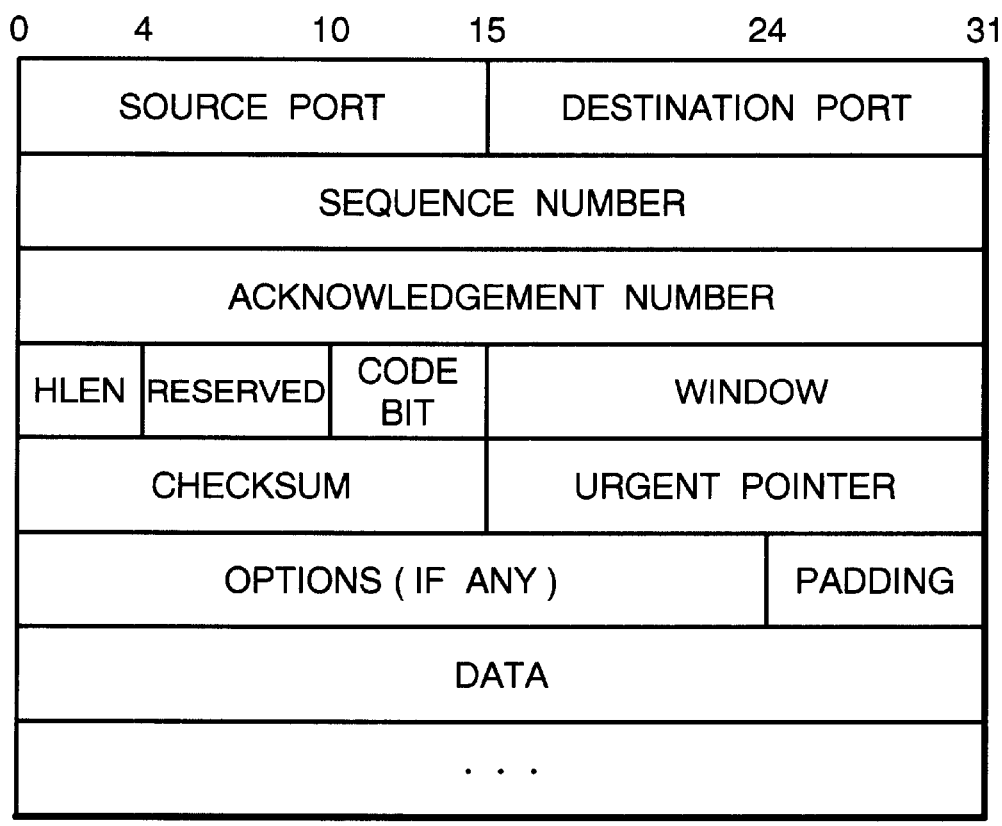
FIG. 10 is a diagram showing the format of TCP.
Figure 11:
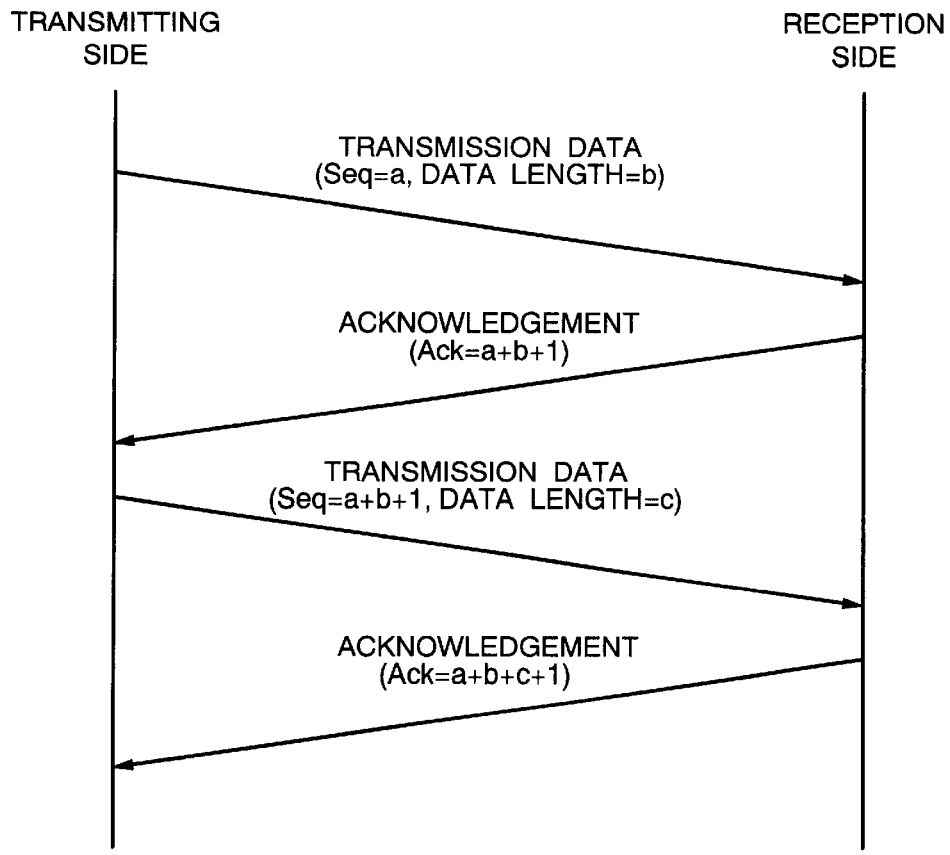
FIG. 11 is a time chart showing the flow of communication processing when TCP is used.
Figure 12:
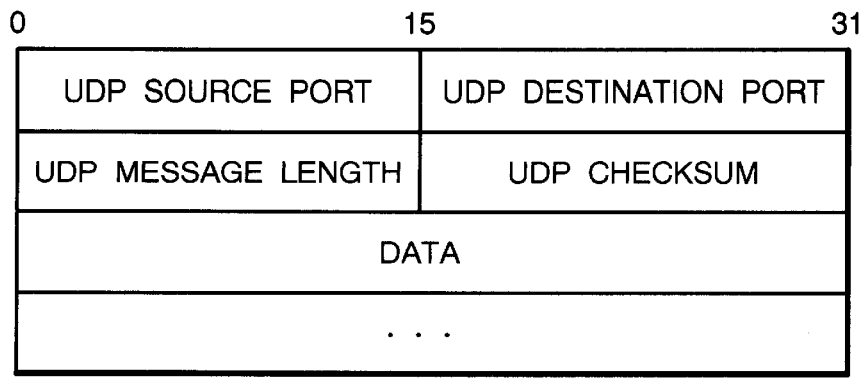
FIG. 12 is a diagram showing the format of UDP.

One effective way to avoid such repetition of the transmission operation of source message is to add a section of request rate to the format of source quench message. More specifically, a request rate is added, as shown in FIG. 9, to the unused section of the source quench message of FIG. 8. This allows the transmitting-side side device that has received a source quench message to decrease the transmission rate to the value of the request rate. By this, it becomes possible to make an optimal decrease in transmission rate, thereby ensuring that the buffer utilization rate will be equal to or below the buffer overflow critical utilization rate without needing to send the source quench message many times unnecessarily.

Although the present invention has been described for one particular preferred embodiment thereof, it should be noted that the present invention is not limited to such embodiment but there are many possible modifications and variations to the invention.

As described above, by using the band controller of the present invention, its buffer overflow quenching method, and the storing medium for storing the buffer overflow quench controlling program, a decrease in transmission rate through the band controller can be controlled by sending a source quench message to the transmitting side, and therefore the problems of lost packets, re-transmission of packets, and the abnormal end of communication as a result of timeout can be avoided efficiently.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A band controller installed on a network between at least a transmitting-side device and a receiving-side device for performing band control, comprising:
   a band setting means for setting a band for traffic through the band controller,
   a frame generating and analyzing means for directing the transmitting-side device to decrease a transmission rate from the transmitting-side device, by:
      analyzing the transmission rate of the traffic over the band controller;
      calculating a buffer utilization rate in buffering that occurs if the transmission rate is greater than the band;
      generating a source quench message if the buffer utilization rate obtained by calculation is equal to or greater than a pre-determined buffer overflow critical utilization rate; and
      sending the source quench message to the transmitting-side device.

2. The band controller as set forth in claim 1, further comprising:
   a storing means for storing a total capacity of one or more buffers in the band controller and said buffer overflow critical utilization rate, and wherein
   said frame generating and analyzing means:
      calculates an amount of buffer space used in the one or more buffers based on the band, said transmission rate, and a transmission time for the traffic;
      calculates said buffer utilization rate from the amount of buffer space used and said total capacity of the buffers; and
      compares the buffer utilization rate with said buffer overflow critical utilization rate to determine whether to generate said source quench message.

3. The band controller as set forth in claim 1, further comprising:
   a timing controlling means for controlling the timing of calculation of a buffer utilization rate and sending of said source quench message.

4. The band controller as set forth in claim 1, wherein said frame generating and analyzing means sends out said source quench message after adding a request rate that shows a requested value to which the transmission rate should be decreased.

5. The band controller as set forth in claim 1, wherein said frame generating and analyzing means sends out said source quench message repeatedly until said buffer utilization rate becomes equal to or less than said buffer overflow critical utilization rate.

6. A buffer overflow quenching method performed by a band controller installed on a network between at least a transmitting-side device and a receiving-side device for performing band control, said method comprising:
   analyzing a transmission rate of traffic over the network;
   calculating a buffer utilization rate in buffering that occurs if the transmission rate is greater than a preset band;
   generating a source quench message if the buffer utilization rate is equal to or greater than a pre-determined buffer overflow critical utilization rate; and
   sending the source quench message to the transmitting-side device.

7. The buffer overflow quenching method as set forth in claim 6, said method further comprising:
   a storing means for storing a total capacity of one or more buffers in the band controller and said buffer overflow critical utilization rate; and
   wherein said method further comprises:
      calculating an amount of buffer space used in the one or more buffers based on the preset band, said transmission rate, and a transmission time for the traffic;
      calculating said buffer utilization rate from the amount of buffer space and said total capacity of the one or more buffers; and
      comparing the buffer utilization rate with said buffer overflow critical utilization rate to determine whether to generate said source quench message.

8. The buffer overflow quenching method as set forth in claim 6, further comprising:
   sending out said source quench message repeatedly until said buffer utilization rate becomes equal to or less than said buffer overflow critical utilization rate.

9. The buffer overflow quenching method as set forth in claim 6, further comprising:
   sending out said source quench message after adding a request rate that shows a requested value to which the transmission rate should be decreased.

10. A computer readable memory storing a buffer overflow quench controlling program for preventing buffer overflows by controlling a band controller installed on a network for performing band control, wherein said buffer overflow quench controlling program causes the band controller to perform the steps of:
    analyzing a transmission rate of traffic over the network;
    calculating a buffer utilization rate in buffering that occurs if the transmission rate is greater than a preset band;
    generating a source quench message if the buffer utilization rate is equal to or greater than a pre-determined buffer overflow critical utilization rate; and
    sending the source quench message to a transmitting-side terminal.

11. The computer readable memory as set forth in claim 10, wherein the program further causes the band controller to perform the steps of:
    storing a total capacity of one or more buffers and said buffer overflow critical utilization rate;

calculating an amount of buffer space used in the one or more buffers based on the preset band, said transmission rate, and a transmission time for the traffic;

calculating said buffer utilization rate from the amount of buffer space and from said total capacity of the buffers; and comparing the buffer utilization rate with said buffer overflow critical utilization rate to determine whether to generate said source quench message.

12. The computer readable memory as set forth in claim 10, wherein said source quench message is repeatedly sent out until said buffer utilization rate becomes equal to or less than said buffer overflow critical utilization rate.

13. The computer readable memory as set forth in claim 10, wherein said source quench message is sent out after a request rate is added that shows a requested value to which the transmission rate should be decreased.

* * * * *